W. N. SEARCY.
FLYING MACHINE.
APPLICATION FILED MAR. 30, 1910.
998,408.
Patented July 18, 1911.
3 SHEETS—SHEET 2.
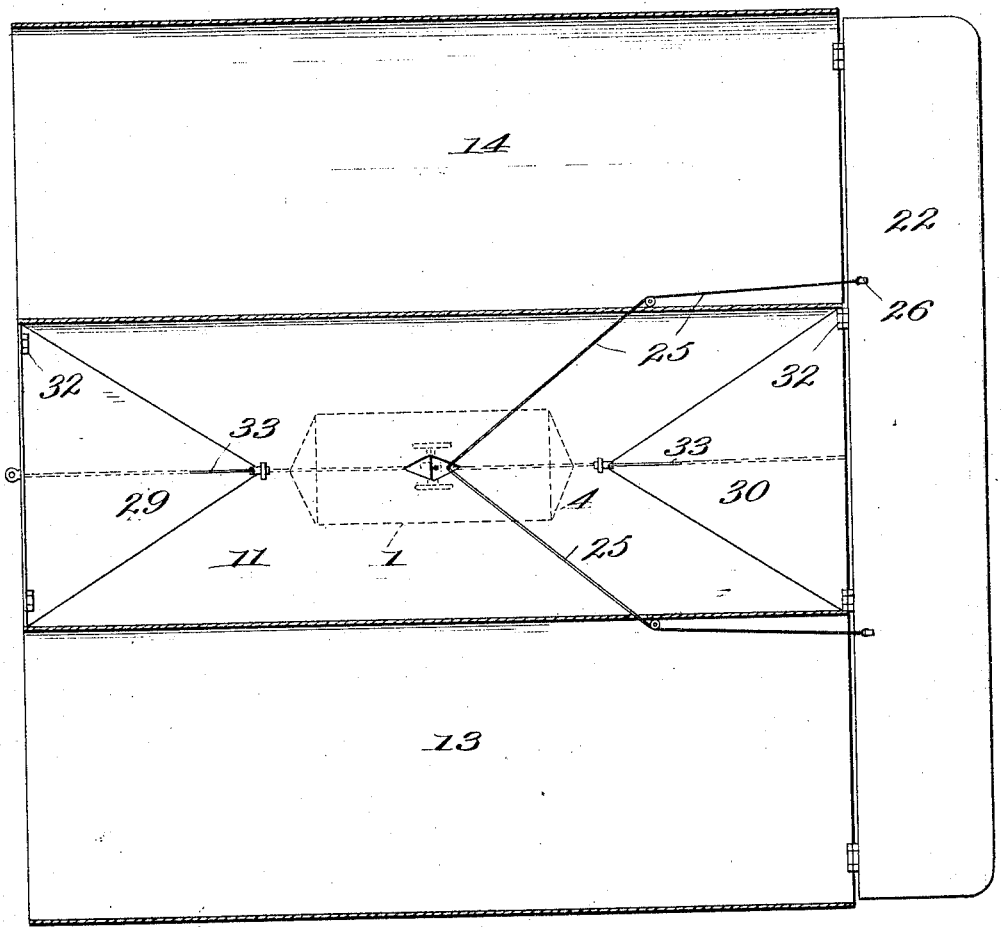
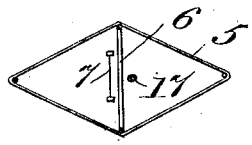
Witnesses
Geo. A. Bynee.
B. B. Collings.
Inventor
W. N. Searcy.
By Wilkinson, Fisher & Witherspoon,
Attorneys.

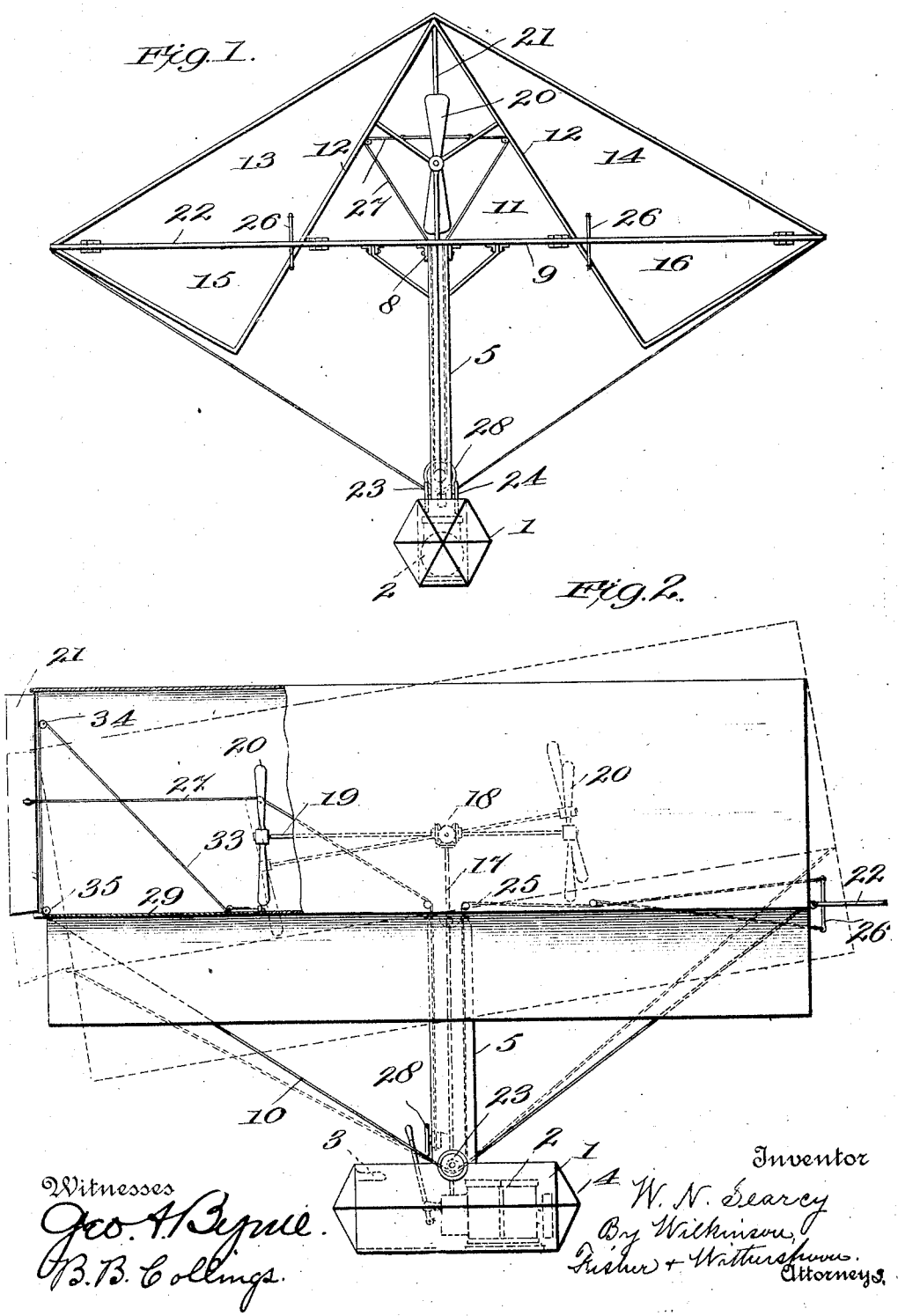

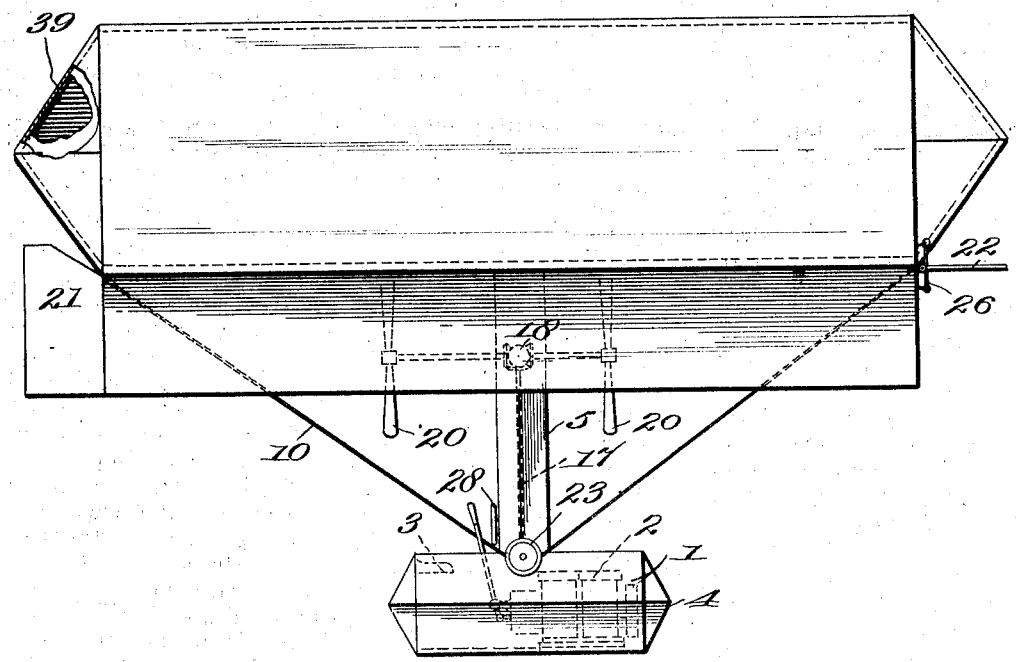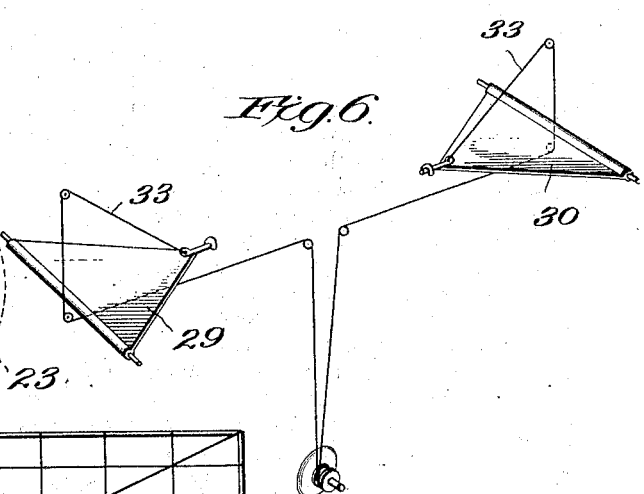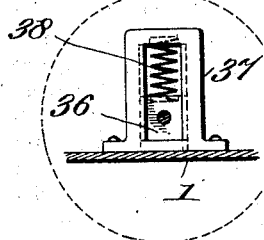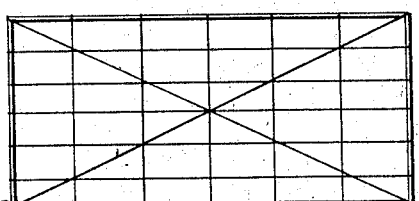

UNITED STATES PATENT OFFICE.

WILLIAM N. SEARCY, OF SILVERTON, COLORADO.

FLYING-MACHINE.

998,408.	Specification of Letters Patent.	Patented July 18, 1911.

Application filed March 30, 1910. Serial No. 552,307.

*To all whom it may concern:*

Be it known that I, WILLIAM N. SEARCY, a citizen of the United States, residing at Silverton, in the county of San Juan and State of Colorado, have invented certain new and useful Improvements in Flying-Machines; and I do hereby declare the following to be a full, clear, and exact description of the invention, such as will enable others skilled in the art to which it appertains to make and use the same.

My invention relates to improvements in flying machines, and the object of my invention is to produce a simple, effective, safe, and easily operated flying machine and one which will be steady and safe in its course of flight and also in falling or descent.

Other objects are to apply and take advantage of the following principles:—(*a*) That in heavier-than-air machines, ascent can be made and altitude in air maintained only by rapidly working propellers or such propellers and broad plane surfaces resisting descent, combined; and that in all machines the propellers are liable to stop, so that the final safety of descent must depend upon the resisting surfaces of the air-ship, producing slow descent or gliding. (*b*) That in order to obtain safety in descent or fall of the machine, broad areas or surfaces of resistance must be maintained; and in order to maintain such broad areas the triangular system of bracing and construction (the diagonal brace) will give the greatest strength and maintain the broadest area for the weight of material used; and the triangular prism form of construction will accomplish this bracing and at the same time take advantage of the box-kite principle. (*c*) That in order to gain and retain absolute control over the broad planes of the airship, and especially to hold such planes to the position of greatest resistance to rapid fall through the air, the principal weight or ballast of the machine must be suspended at a distance below such resisting planes or surfaces, and must be firmly attached to them, and yet by a pivoted or hinged attachment so as to control their dip or inclination, through a rigid but pivoted vertical mast or structure; and that a single hollow, rigid mast will accomplish this end with the least possible weight of material for the strength obtained, and at the same time will furnish the best means through which to transmit power and guidance to the machinery and mechanism in the body of the air-ship. (*d*) That among the forms of resisting surfaces or planes usable in constructing the body of the airship the form of a triangular box-kite or hollow prism open at the ends, when a number of such prisms are used in combination, will give the greatest strength for weight of materials used and will enable construction and maintenance of the broadest area of surface, the sides of the prisms serving to brace the entire structure and the several prisms serving to reinforce each other. (*e*) That by proper arrangement and combination of these triangular hollow prisms a form of machine can be made presenting sharp or acute edges at the sides so as to offer the least resistance to and be least affected by side currents or winds; and at the same time, by the same arrangement, the under surface of the body of the mahcine can be made to present a concave or trough-like surface so as to give more definite course to the machine in forward flight, and greater resistance to sudden fall through the air, on the principle of the weighted parachute. (*f*) That by proper arrangement and combination of triangular hollow prisms, open at the ends, the most efficient housing can be afforded for propeller wheels operating within the prisms or within inclosed tubes, giving the greatest driving efficiency, and at the same time affording the best frame for holding the shafts or axles of such wheels and the most convenient connection with the driving machinery below, through the hollow mast. (*g*) That by proper arrangement of and combination of the triangular prisms, a central one may be so placed as to shelter and hold, if desired, a balloon bag or gas bag, laid horizontally, and at the same time the same may be protected by the walls of other prisms, so as to be shielded by double walls from the rays of the sun, thus preventing inflation and bursting of the balloon. (*h*) That a machine so built and constructed, on the principle of broad area of under surface, absolutely controlled by and through a pivoted, hollow, vertical mast, with the principal weight attached firmly to the bottom of the mast, can drift but can not over-turn, and can fall only against the most perfect resistance of the entire resisting surface of the air-ship. (*i*) That the mast must be constructed of such a form as to give the greatest strength and rigidity for the weight of materials used and yet to offer the least resistance to the forward movement of machine through the air; and that the triangular form of construction, with diagonal bracing, will accomplish that end, the double-triangle or diamond form in cross-section being preferable, with acute edges to front and rear in line of flight. And that the parachute effect of the machine may be increased by a device for temporarily opening the bottom of the central prism and closing the ends thereof. (j) That a machine so constructed will give the greatest efficiency to and the most convenient application of any form of revolving propeller; and will give most efficient means of applying and operating any form of rudders, vertical or horizontal; and will give most efficient means of carrying and applying any kind of power from any form of engine or motor; and will give the greatest degree of control over the course of flight or the angle of rise or descent of the machine; and the greatest safety against too sudden fall.

With the objects and principles of invention stated in view, my invention consists in the construction and combination of parts as hereinafter described and claimed.

In the accompanying drawings—Figure 1 is a front view of my improved flying machine. Fig. 2 is a side view of the same, parts being shown in section. Fig. 3 is a horizontal cross section thereof. Fig. 4 is a top view or cross section of the mast. Fig. 5 is a side view of the bearing in which the shaft of one of the adjusting wheels is mounted. Fig. 6 is a diagrammatic view, showing the method of operating the movable triangular parts of the bottom of the main prism. Fig. 7 is a view of one of the sides of one of the prisms, showing the bracing means. Fig. 8 is a modified form, having a gas bag or balloon in the main prism.

In the popular form of aeroplanes used at the present time, the weight of the operator and machinery is placed practically in the line of the lower plane, and hence the machines are greatly affected by currents of air, are easily overturned, and are therefore unsafe. In my machine, however the weight of operator, machinery and cargo, making the ballast of the air-ship, is placed far below the lowest plane, at the bottom of a rigid mast, whereby the principal weight may be carried far below the planes, thus making the machine on the principle of a weighted parachute with the weight at the bottom of the stem, which will drift but not overturn, and may glide or settle down but can not fall.

1 represents a car, basket or similar structure, in which is mounted the engine or motor 2, and which is provided with seat 3 for the operator. The front and rear of the car are pointed or brought to an acute edge as shown at 4, to offer as little resistance as possible to the passage of the car through the air.

Rigidly attached to the upper part of the car or basket (and extending to the bottom of the car if desired) is the mast 5. This mast as shown in Fig. 4, consists of two hollow triangular prisms, composed of cornerposts and frame of lattice-work bracing, covered with canvas or other light material. In other words the mast is of diamond shape in its cross section, with the sharp points arranged in the line of flight of the machine so as to minimize the resistance, and has a cross partition 6 in the center to brace it. The mast may be made of a single triangular prism set with sharp point forward in the line of flight, but the diamond form is preferred, especially in larger machines.

The mast must be strong enough to stand the strain upon it and large enough to permit the passage of the shafts, cords, pipes, &c., and in larger machines a ladder 7 is arranged so that the operator may climb to the machinery above. Thus, in the diamond form, there are two compartments to the hollow mast, through one of which shafts, wires, pipes, rods and other devices for transmitting power to the propellers, controlling the rudders, &c., may pass, and the other for the use of the operator; thus giving the greatest possible strength and capacity to the mast, and the least possible resistance to the air. This mast is pivotally attached, as shown at 8 to the plane 9, so that the supporting planes of the machine may be tilted, as shown in dotted lines in Fig. 2, while the mast remains vertical. The mast could also be made so that it could be drawn toward either side of the machine, as well as toward either end, thus inclining the side of the machine so as to take advantage of the lifting power of a constant side wind; but as the sides of the machine are so formed as to present a sharp or acute edge to the side winds or currents, the mast is shown braced by braces and cables as shown in Fig. 1 and at 10, so as to resist any side motion.

The lifting and supporting part of the machine (corresponding to the planes of the ordinary aeroplane) is composed of a group of long triangular prisms, hollow and in general open at the ends, so as to give direction to the machine and take advantage of all the principles of the box-kite. The side of one prism also forms a side of the adjacent prism, and the framework in the side of one prism may in proper case extend to form part of the frame work of the side of an adjacent prism lying in the same plane. The sides of each prism may be provided with diagonal or other forms of cords or braces, located within or against such sides, as shown in Fig. 7, thus giving great strength to each side and to the whole prism, without creating resistance to the air. The triangular form of construction and bracing also gives the greatest bracing power and strength possible for the amount of material used, and each triangle acts as a brace to the others. Furthermore, by the combination of these triangular prisms, the greatest practicable area of surface can be sustained and maintained on the under surface of the machine, and yet the acute angle of least resistance is presented to the side-winds which would otherwise drive and drift the machine out of its course.

11 represents the central triangular hollow prism, having a bottom 9 and sides 12. On each side of this central prism are triangular prisms 13 and 14, and below the plane of the bottom 9 are smaller triangular prisms 15 and 16, all of these triangular prisms being hollow; the side of one prism forming the side of the adjacent prism, and the framework of one prism side extending to form the frame work of a side of another prism in the same plane.

In this machine it is intended that any usual form of engine or motive power may be used; that any usual or common method of transmitting that power to the propellers may be used; that the propellers themselves may be of any usual or convenient type or kind and set at any convenient place within the prisms or under them. But the machine offers especial advantage and convenience in the operation of the propellers, and gives them special power and efficiency, if they are set within the triangular prisms, or within circular tubes set within such prisms.

In Fig. 1 and Fig. 2, the engine, by ordinary means, drives the shaft 17, which by means of the beveled gear wheel 18 drives the shaft 19, preferably provided with a propeller such as 20 at each end. The propeller wheels are shown mounted inside of the central prism 11, which is most convenient and preferable; but it is obvious that they may be mounted in prisms 15 and 16 if desired, or on a shaft extending through the mast 5 in the line of flight, below the planes, or on a longer shaft in prism 11, outside of its ends. As shown above, the entire body of the machine, that is the planes or prisms, may be tilted or inclined relatively to the vertical mast 5, as shown in dotted lines in Fig. 2, for the purpose of ascent or descent of the machine, and so as to cause the machine while driven forward to rise in the air or remain at constant altitude as may be desired. The tilting or inclining of the planes with reference to the mast may be accomplished in any suitable manner; but the method of tilting shown in Fig. 2 is preferable and advisable. In Fig. 2 the cord or cable 10, attached to the ends of the plane 9 is drawn through and around the hand wheel 23, by the turning of which the cord or cable is drawn through and the body of the machine tilted. The wheel 23 is set in a movable block or bearing 36, set between vertical tracks or grooves 37, and is held down by a strong spring 38 to take up any slack of the cord 10. Thus whether the front end of the planes or body of the airship be tilted up or downward from the horizontal—whichever way the wheel 23 be revolved from the normal position—the wheel 23 and its block or bearing would be forced downward to take up the slack created in the cable.

It is intended that any usual, common or convenient steering rudders may be used on this machine, whether horizontal rudders or vertical rudders; and that same may be attached to the body of the machine or to the mast, either directly or at the end of bars or stems; and further that such rudders may be controlled and operated by any of the usual, customary or convenient methods in use, the form of rudder suggested herein not being a vital point. But the form of machine herein shown and invented gives especial convenience and efficiency in the application and operation of the rudders, whatever form may be used, on account of the hollow mast, and the convenience of transmitting control through the same. The machine as shown is provided with a vertical steering rudder 21 in the rear, for directing the machine sidewise, and may have a similar rudder in front. There is also shown a horizontal rudder 22 in front to aid in causing the machine to rise or descend in its flight. The horizontal steering plane may be tilted by means of the wheel 24 and the cords 25, which pass over a pulley and have two ends which engage the vertical levers or pins 26 passing through the plane 22. The two cords thus diverge as shown in Fig. 3, thus giving proper leverage to be applied to plane 22. The cords 25 pass over pulleys and down the mast to the winding drum near the point 23 in the car, so that revolving this drum one way or the other will raise or lower the front of plane 22. The vertical rear steering gear and rudder are also adjusted in substantially the same manner. 27 represents a cord which runs from the steering plane 21 over pulleys and down the mast and around the drum or wheel 28, so that revolving the drum the one way or the other draws the one cord and releases the other, thus drawing the plane 21 to the one side or the other. The levers or pins attached to the plane or rudder 21 are similar to the levers on the plane 26, or the pulleys may be placed apart near the rudder 21, thus giving the same leverage.

To increase the effect of the machine as a rigid parachute in case of accident, I have provided means whereby the whole machine may be further converted over to the parachute principle by opening the bottom of the large central prism 11 and by the same device closing the ends of that prism. To that end the bottom 9, in prism 11 is not made solid, but is provided with two triangular portions 29 and 30 of the proper shape and size to close the ends of the prism 11 when they are swung upwardly on the hinges such as 32 on which they are mounted. This is accomplished by means of cords such as 33, one end of each of which is attached to the triangular portions 29, 30, and passes up over guide pulleys such as 34, 35, and down through the hollow mast to car or basket 1, the construction on both ends of the machine being the same. The cords 33, also release the catch or lock which ordinarily holds the portions 29, 30, in place, by the same pull or force that lifts them to vertical position. By swinging up the parts 29, 30, the machine is converted into a horizontal parachute, held rigidly to position by the mast with its weight or ballast at the bottom, so that the machine can not overturn but must settle gradually against the resistance of its fixed planes and parachute box, or glide downward at an angle as the operator may choose.

In case the propeller wheels are placed within the central triangular prism 11, and it is desired at the same time to construct and use the safety doors or flaps 29, 30, then the propellers should be placed far enough in from the end of prism 11 to allow the raising and closing of the flaps or doors 29, 30.

For rapid flight, the triangular prism 11 should be left open at the ends ordinarily, the same as the other prisms, and the principal propeller wheels installed therein; but it is also intended, and is feasible, when greater safety and less weight is more desirable, that the central prism may be permanently closed at the ends, and the ends pointed or brought to acute edge, and a horizontal gas bag 39 installed within the closed prism 11. Thus the gas bag would aid in lifting the weight and in retarding the fall, and yet such bag would be protected by two walls of canvas from the rays of the sun, thus preventing inflation and bursting. In that case the propellers would be placed in the prisms 15 and 16, or on the mast below the planes.

The especial advantage of the central triangular prism for the support of a gas bag consists of the fact that it is thoroughly braced, stands directly over the mast and the principal weight below and is protected as above explained.

Several points of particular value in connection with this machine are: the form of construction by combination of triangular prisms, thus giving a diagonal or truss effect to the bracing, and giving the greatest amount of strength for the weight of materials used and at the same time making possible the maintenance of the broadest practicable area of surface; especially on the under side of the body of the machine; the presentation of acute angles of least resistance to side currents; the carrying of the operator and heavy machinery making the ballast, far below the planes, in a car at bottom of a mast firmly yet pivotally attached to planes above, thus giving absolute control of the inclination of the planes, and especially holding such planes to the horizontal position of greatest resistance to the fall of the machine through the air; and the parachute effect of the body of the machine itself; and the mast as constructed, offering the greatest convenience for transmission of power and guidance through its hollow interior and at the same time offering the greatest possible strength of construction for the weight of materials used, and the least possible resistance to the air in forward flight.

As above stated, the machine may be composed of any number of triangular boxes or prisms, so arranged as to produce a broad area of under surface and strength to maintain that surface; but the special arrangement of five prisms shown in the drawing accomplishes several valuable results, namely: (1) The body of machine presents acute angles to side winds as above described, with practically equal angles above and below the edges thus minimizing the effect of side currents. (2) In the central part of the under surface a concave box or surface is presented, offering no resistance in forward movement but giving a definite course to the machine in its flight, and in the direct fall or descent of the machine offering great resistance to the too rapid descent. (3) The central triangular prism, being located directly over the mast, is practically equilateral, is braced by the other prisms, affords a specially strong frame for the propellers and driving gear, and the propeller wheels in turn can be easily operated through the mast from the engine located in the car below. (4) The frame timbers of the central prism extend to form the frame timbers of adjacent prisms, thus obtaining the strength of such timbers for bracing the entire machine without additional weight. (5) This central triangular prism can be readily converted into a safety device by closing the ends permanently with pointed ends and opening the bottom; or by raising the trap doors in the bottom the ends may be closed temporarily only, as above shown; and in either case the central prism and the machine accomplish the effect of a large parachute held firmly in its horizontal position by the rigid mast and the weight below; and the central triangular prism, as above shown, offers an especially advantageous place and protection for the horizontal gas bag, in case it is desired to so lighten the machine, in which case the prisms 15 and 16 may be used to house the propellers.

I claim:—

1. In a flying machine, the combination of a supporting structure composed of hollow triangular prisms, a diamond shaped mast depending centrally from the supporting structure and arranged with a sharp corner in the line of flight, a car supporting the engine, operator and principal weight attached to lower end of mast, and means for holding the supporting structure horizontal and for tilting same to rise, descend or preserve a level line of flight, substantially as described.

2. In a flying machine, the combination of a supporting structure consisting of a plurality of open ended hollow triangular prisms constructed and secured together with their open ends in the line of flight of the machine and presenting a sharp edge sidewise, a depending mast hinged to said supporting structure near the center thereof, and means for closing the ends of the central triangular prism to convert the device into a parachute, substantially as described.

3. In a flying machine, the combination of a supporting structure composed of open-ended, hollow triangular prisms constructed and secured together so as to present the open ends in the line of flight of the machine, and to present sharp edges at the sides, some of the side prisms projecting down below the central prism, leaving a hollow space, a mast hinged to said supporting structure near the center thereof, means for tilting said supporting structure relatively to the mast, vertical and horizontal steering planes attached respectively, to the ends of the machine, and means for adjusting and controlling said steering planes, substantially as described.

4. In a flying machine, the combination of a supporting structure of broad area, braced on the diagonal or triangular plan, with a mast hinged or pivoted centrally to said supporting structure and depending therefrom, such mast being of hollow diamond form and arranged with a sharp corner in the line of flight, a car carrying the operator and principal weight or ballast rigidly attached to bottom of mast, means for tilting said structure relatively to such mast, means for guiding and propelling said machine, and means for communicating power and guidance from the car below, through the mast, to the propelling and guiding machinery, substantially as described.

5. In a flying machine, the combination of a supporting structure composed of hollow triangular prisms constructed and combined together, having their open ends disposed in the line of flight of the machine, and so combined as to present acute edges to the sides and a hollow trough-like space on the under surface, a hollow, diamond shaped mast hinged to said supporting structure near the center thereof and depending therefrom, a car carrying the operator, principal machinery and cargo and principal weight firmly attached to lower end of mast, an operating engine or motor in said car, operating rudders for the guidance of such machine attached to the body thereof, propellers to drive such machine, means for tilting and controlling the angle of said structure with reference to the vertical mast, and means for transmitting power and guidance through such mast to the propellers and rudders, with means for opening bottom of central prism and closing the ends thereof to increase the parachute effect of the machine, substantially as described.

6. In a flying machine, the combination of a supporting structure of broad area, with a vertical, hollow diamond shaped mast hinged to and depending from near the center of such structure, said mast being arranged with one of its sharp corners in the line of flight with a car, carrying the engine, operator and principal weight as ballast firmly attached to the bottom of the mast, with means for absolutely controlling the angle or inclination of such structure with reference to the vertical mast, operating rudders and propellers to guide and drive such machine, and means for communicating power and guidance through such mast to such propellers and rudders from the car below, substantially as described.

7. In a flying machine, the combination of a supporting structure made of five open-ended triangular prisms, constructed together, arranged with their open ends in the line of flight of the machine, three of said prisms being mounted side by side and having their lower edges in a common plane, and two of said prisms being mounted below said plane, a mast hinged to said supporting structure near its center, a car carried by said mast and attached to its bottom, an engine mounted in said car, propellers, connections extending from said engine to said propellers upwardly through said mast, and means for tilting said supporting structure and controlling its angle relatively to said mast, substantially as described.

8. In a flying machine, the combination of a supporting structure composed of five open ended hollow triangular prisms, three of said prisms being mounted side by side on a common base, and two of said prisms being mounted below said base, trap doors in said bottom, arranged to be swung up to close the end openings in the central triangular prism, a mast centrally hinged to and depending from said supporting structure, and means for tilting said structure and controlling its angle relatively to said mast, substantially as described.

9. In a flying machine, the combination of a supporting structure composed of five open ended, hollow triangular prisms, three of them arranged side by side on a common base and two of them arranged below said base plane, the open ends of said prisms being in the line of flight of the machine, a mast hinged to said structure near its center and depending therefrom, a car firmly secured to the lower end of the mast, propelling devices in such machine, and an engine mounted in said car, connections between said engine and said propelling devices, means to control the inclination of said structure with reference to such mast, and adjustable horizontal and vertical steering planes connected to said supporting structure at each end thereof, substantially as described.

10. In a flying machine, the combination of triangular prisms open at the ends and each prism being hollow, with a central triangular prism braced by the surrounding prisms and the frame-timbers of the central prism extending to form the frame timbers in the sides of adjacent prisms, all arranged so as to present acute edges of practically equal angle above and below the edge, at the sides, all arranged so as to present a hollow or trough-like under surface, with a vertical, hollow mast hinged to and depending from a point near the center of such supporting structure, with car for holding operator, cargo and power-creating machinery as ballast firmly attached to the bottom of the mast, means for controlling the inclination of such supporting structure with reference to the vertical mast, propellers within said central prism and the outer prisms of the structure, means for opening the bottom and closing the ends of such central prism, means for transmitting power to such propellers and guidance to the rudders of the machine through such vertical mast from the car below, with convenient means for operating the propellers in such outer triangular prisms and a gas bag in the central prism, substantially as described.

In testimony whereof, I affix my signature, in presence of two witnesses.

WILLIAM N. SEARCY.

Witnesses:
W. W. GRIMES,
WM. H. CROOKE.